E. E. SILL & A. H. BENNETT.

Agricultural Boiler.

No. 4,863. Reissued April 9, 1872.

Fig. II.

Fig. III.

Witnesses
Charles C. Gorny
Stephen Culver

Inventors
Ebenezer E. Sill
Alonzo H. Bennett

AM. PHOTO-LITHOGRAPHIC CO. N.Y. (OSBORNE'S PROCESS.)

UNITED STATES PATENT OFFICE.

EBENEZER E. SILL AND ALONZO H. BENNETT, OF ROCHESTER, NEW YORK; A. H. BENNETT ASSIGNS TO EBENEZER E. SILL.

IMPROVEMENT IN AGRICULTURAL BOILERS.

Specification forming part of Letters Patent No. 109,679, dated November 29, 1870; reissue No. 4,863, dated April 9, 1872.

Specification describing certain Improvements in Agricultural Steamers and Caldrons, invented by EBENEZER E. SILL and ALONZO H. BENNETT, of the city of Rochester, in the county of Monroe and State of New York.

The first part of our invention consists in constructing a steamer or steam-generator and caldron combined, by placing one kettle or caldron within another, uniting them at their rims, providing a water and steam space between them, and setting them in a furnace to be fired, so that the two thus united and set form a steam-generator, while the inner one, which is open when so united, can be used at the same time and in connection with the generator as an open caldron. The second part of our invention consists in forming at the bottom of the outer and lower caldron a sectional depression, open in front of the furnace-feeding door, and made to extend lower than the common bottom, for the purpose of augmenting the fire-surface, presenting it more directly to the action of the fire, intercepting the direct passage of the flame to the exit-flue, and thereby more fully utilizing the products of combustion. The third part of our invention consists in raising and rolling over outwardly the upper portion of the inner caldron, so as to strengthen the same, enlarge the steam-space, and facilitate connecting the kettles. The fourth part of our invention consists in constructing a furnace, within which the steamer and caldron are placed for firing or heating, having a double air-space surrounding the fire-chamber, for the purpose of protecting the same from being burned, and preventing the loss of heat by outward conduction and radiation.

Figure 1:
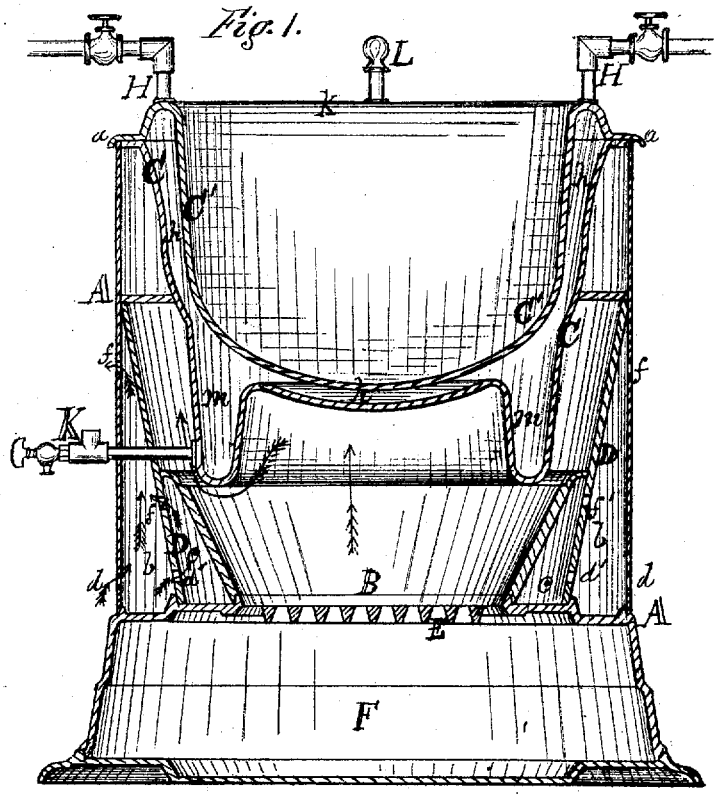
Figure 1:
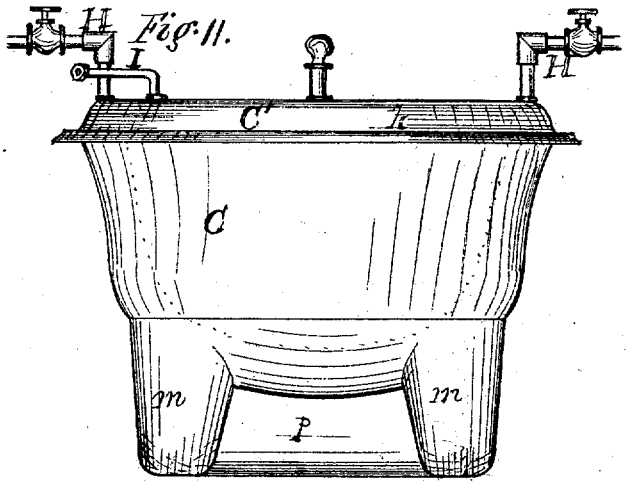
Figure 1:
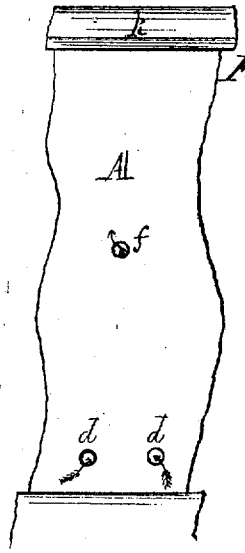

In the accompanying drawing, forming part of this specification, and to which reference is made, Figure 1 is a section, produced by cutting the apparatus centrally and vertically, showing the air-spaces, the form of the several parts, and their relation to each other. Fig. 2 is an elevation of the steamer and caldron proper removed from the furnace. Fig. 3 is a fragment of the outer shell of the furnace, showing some of the orifices for the admission and discharge of air-currents to and from the air-spaces.

The steamer or generator is formed, as shown in Fig. 1, by placing one caldron or section within another. The inner caldron C′ is set within the outer caldron C at such distance therefrom as to furnish a sufficient water and steam space, *h*, between them. The two caldrons are united at their respective rims, as shown in Figs. 1 and 2, and are held together by bolts, not shown. The caldron C′, for its support, and for the support of the whole generator, rests by its rim *a* upon the top of the outer shell of the furnace. The two caldrons thus united and supported are set within the furnace A, Fig. 1, for the purpose of being fired or heated; and the exterior surface of the caldron C constitutes the fire-surface to which the heat of the furnace is applied. The caldrons may be made of cast-iron or sheet metal, and may be considerably varied in form; but, to render the steamer more effective, a section of the outer caldron C, about intermediate the side and bottom all around, excepting at *p*, in front, is depressed, as shown at *m*, Fig. 1, and made to extend lower than the common bottom and nearer to the fire. An opening, *p*, in the depression in front is made to allow a free delivery of fuel to the fire-chamber. The depression described largely increases the fire-surface, brings a portion of it more directly into the heated currents, forms a cavity immediately over the fire, in which the temperature is kept sufficiently high to consume the gases evolved, intercepts and utilizes more fully the radiated heat, and prevents the direct passage of the flame to the smoke-funnel, and causes it to impart more heat by contact, whereby steam is generated with less fuel, more rapidly, and in greater quantity. The upper portion of the inner caldron, as shown at *k*, Figs. 1 and 2, is raised and turned over outwardly and downwardly, by which the portion named is strengthened, the steam-space is enlarged without increasing the height of the furnace, and the rim is brought to correspond in width and position with that of the outer caldron, so that the two can be more conveniently and in a better manner connected. The inner and upper caldron, while within and united to the outer and lower one, as described, is open, as shown in Fig. 1, and, without detachment, can be used as an open caldron or kettle for boiling, evaporating, and other purposes at the same time that the two together, as a generator, are employed to produce steam for propelling small machinery, heating, cooking, and other purposes; the apparatus being thus a steamer and caldron combined. Pipes H H are connected with the steam-space for conducting the steam to the tanks, vats, and other receptacles in which it is to be employed. A pipe, I, connects the steam-space of the generator with that of an automatic feeder for the purpose of counteracting the upward pressure of the water therein. A pipe, K, connects with the bottom of the water-space, and has a branch to the feeding apparatus, and is used both for feeding and discharging. A safety-valve, L, is affixed to a pipe communicating with the steam-space to prevent excessive pressure. The furnace consists of an outer shell, A, the fire-chamber B, the intermediate lining D, the grate E, and ash-pit F. The shell A is a vertical cylinder made of cast or sheet iron, or of both. It surrounds the generator, and supports the same by the flange *a* resting upon its upper end. The fire-chamber—the receptacle in which the fuel is held and burned—is made in the ordinary manner, and is placed beneath the steamer, as shown in Fig. 1, so that the heat from the chamber is imparted directly to the exterior caldron. Between the outer shell and the fire-chamber is an intermediate lining, D, which, at its bottom, rests upon the covering of the ash-pit, and is inclined outwardly and extended upward half way or more the height of the steamer, at which point it touches the shell, as shown in Fig. 1. Such arrangement forms a double air-space, composed of spaces *b* and *c*—the outer one, *b*, being between the outer shell and the lining D, and the inner one, *c*, between the lining and the fire-chamber B. Apertures *d d* and *f*, respectively at the bottom and top of the space *b*, are made through the shell, and similar openings, *d′ d′* and *f′*, are made through the lining D into the inner air-space *c*, as shown in Figs. 1 and 3. By means of the lining and apertures described a compound circulation of air between the outer shell and fire-chamber is effected—first, from without through *d* into the space *b*, and out through *f*, and, second, from the space *b*, through *d′*, into the space *c*, and out through *f′*. The double air-space houses the fire-chamber and keeps up its temperature to a degree sufficient to insure combustion at times when the fire becomes low and would otherwise go out. And the compound circulation described moderates the temperature of the air within the spaces sufficiently to prevent the fire-chamber and inner lining from being overheated and burned. The grate E and ash-pit F are made in the usual manner, and are without peculiarity.

We claim as our invention—

1. A combined steamer and caldron, composed of two kettles, C C′, resting one within the other, and united at their tops, leaving a water and steam space between them and firing-surface beneath, and against the outside of the outer one, whereby the two form a generator of steam, while the inner one, without detachment, can be used as a jacketed open caldron, substantially as and for the purpose set forth.

2. The depression of the section *m* in the outer caldron C, having the opening *p* in front, substantially as described, and for the purposes set forth.

3. The upper portion *k* of the inner caldron C′, raised and turned over outwardly and downwardly, substantially as and for the purposes described.

4. The double air-space *b c*, surrounding the fire-chamber B, in which a compound circulation of air is effected by means of the apertures *d f* and *d′ f′*, formed and arranged substantially in the manner as and for the purposes set forth.

EBENEZER E. SILL.
ALONZO H. BENNETT.

Witnesses:
CHARLES C. YOUNG,
STEPHEN CULVER.